United States Patent
Glenn et al.

(10) Patent No.: US 7,167,533 B2
(45) Date of Patent: Jan. 23, 2007

(54) APPARATUS AND METHOD FOR COMMUNICATION LINK RECEIVER HAVING ADAPTIVE CLOCK PHASE SHIFTING

(75) Inventors: Robert C. Glenn, Bend, OR (US); Neil P. Kelly, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 09/895,481

(22) Filed: Jun. 30, 2001

(65) Prior Publication Data

US 2003/0002608 A1    Jan. 2, 2003

(51) Int. Cl.
*H04L 7/00* (2006.01)
(52) U.S. Cl. .................... 375/371; 375/355
(58) Field of Classification Search .......... 375/316, 375/354, 355, 371, 373; 327/269, 270; 713/400, 713/401, 500, 501, 503
See application file for complete search history.

(56) References Cited

U.S. PATENT DOCUMENTS

| | | | |
|---|---|---|---|
| 3,980,826 A | 9/1976 | Windmer | |
| 4,821,297 A * | 4/1989 | Bergmann et al. | 375/376 |
| 5,467,040 A | 11/1995 | Nelson et al. | |
| 6,034,558 A * | 3/2000 | Vanderschoot et al. | 327/277 |
| 6,151,356 A * | 11/2000 | Spagnoletti et al. | 375/226 |
| 6,178,212 B1 * | 1/2001 | Akashi | 375/355 |
| 6,493,320 B1 | 12/2002 | Schober et al. | |
| 6,496,540 B1 | 12/2002 | Windmer | |
| 2002/0085656 A1 * | 7/2002 | Lee et al. | 375/355 |

OTHER PUBLICATIONS

U.S. Appl. 60/229,369.*
Brunetti, J., et al., Xilinx, "The LVDS I/O Standard", XAPP230 (v1.1), Nov. 16, 1999, pp. 1-6, www.xilinx.com.

* cited by examiner

*Primary Examiner*—Kevin Kim
(74) *Attorney, Agent, or Firm*—Blakely, Sokoloff, Taylor & Zafman LLP (57) ABSTRACT

A method is described that includes sampling data at a plurality of different relative phase positions between a clock signal and a data signal. The method also includes separately adjusting both the data signal's phase position and the clock signal's phase position to change the relative phase positions between the clock signal and the data signal at which data is sampled. Circuitry capable of performing the method is also described.

11 Claims, 5 Drawing Sheets

APPARATUS AND METHOD FOR COMMUNICATION LINK RECEIVER HAVING ADAPTIVE CLOCK PHASE SHIFTING

FIELD OF THE INVENTION

The field of invention relates to data signal processing generally; and more specifically, to compensating for the skew that exists between a clock signal and a data signal.

BACKGROUND

Figure 1:
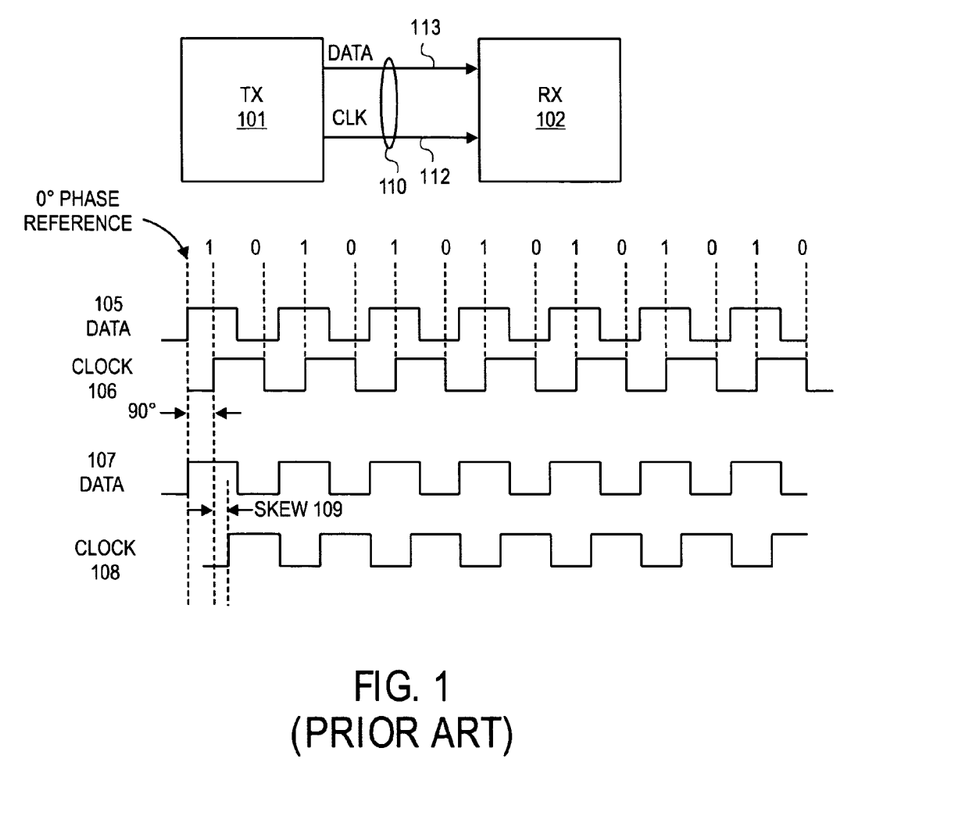
FIG. 1 shows a serial data link.

FIG. 1 shows a pair of transmitting and receiving semiconductor chips (or units) 101, 102 coupled together by a serial link 110 having a data signal line 113 and a clock signal line 112. The transmitting unit 101 sends a data signal 105 to the receiving unit 102 along data signal line 113. The receiving unit 102 uses a clock signal 106 that is sent along clock signal line 112 to receive the data 105.

That is, in the example of FIG. 1, the receiving unit 102 clocks the data signal 105 on the rising edge of the clock signal 106. The clock signal 106 may be referred to as a quadrature clock because the phase of its rising edges are 90 degrees away from the rising edges of the data signal 105 (using the data signal 105 as a phase reference). A link that transmits a clock along with data may be referred to as a source synchronous interface. Various source synchronous interfaces exist such as, for example, Low Voltage Differential Signalling (LVDS) and Serial Gigabit Media Independent Interface (SGMII).

A problem with serial links, particularly as their frequency of operation rises, is the presence of skew 109 between a data signal 107 and a clock signal 108 when it is received at the receiving unit. Skew 109 is any phase relationship between the edges of the data signal 107 and clock signal 108 other than the nominal or "designed for" phase relationship (such as 90 degrees, using the data signal 105 as a phase reference).

Skew may arise because the transfer function and/or trace length of the data signal line 113 is different than the transfer function and/or trace length of the clock signal line 112. For example if the data signal line 113 is shorter or has less capacitance than the clock signal line 113, the rising edges of the clock signal 108 can have more than 90 degrees of phase shift with respect to the rising edges of the data signal 107.

For a given difference in transfer function and/or trace length between the data and clock signal lines 113, 112, greater skew is observed between the data signal 107 and clock signal 108 as the frequency of operation of the serial link 110 increases. That is, the differences between the signal lines 113, 112 have an effect on the delay of the signals as they propagate from the transmitting unit 101 to the receiving unit 102. As the frequency of the serial link's operation rises, the delay represents a greater percentage of the data signal's pulse widths.

As skew 109 increases the performance of the serial link degrades. That is, because the receiving unit 102 uses the clock signal to clock the reception of the data carried by the data signal 107, the "misposition" of the clock signal 108 edges causes the receiving unit 102 to consistently clock incorrect data.

BRIEF DESCRIPTION OF THE DRAWINGS

The present invention is illustrated by way of example and not limitation in the figures of the accompanying drawings.

FIG. 2b shows clock alignment that is "leading" with respect to the proper clock alignment of FIG. 2a;

FIG. 2c shows clock alignment that is "lagging" with respect to the proper clock alignment of FIG. 2a;

DETAILED DESCRIPTION

An approach to eliminating skew involves, within a receiving device, comparing the data sampled from a plurality of clocks that have different phase positions with respect to one another. For example, referring to FIG. 2a, the phase positions 201a, 202a, 203a of three clocks are shown. The phase position of a clock corresponds to the temporal location where data is sampled with the clock. For example, if data is sampled on the rising edge of a clock, the phase position of the clock corresponds to the temporal location of its rising edge(s).

Figure 2A:
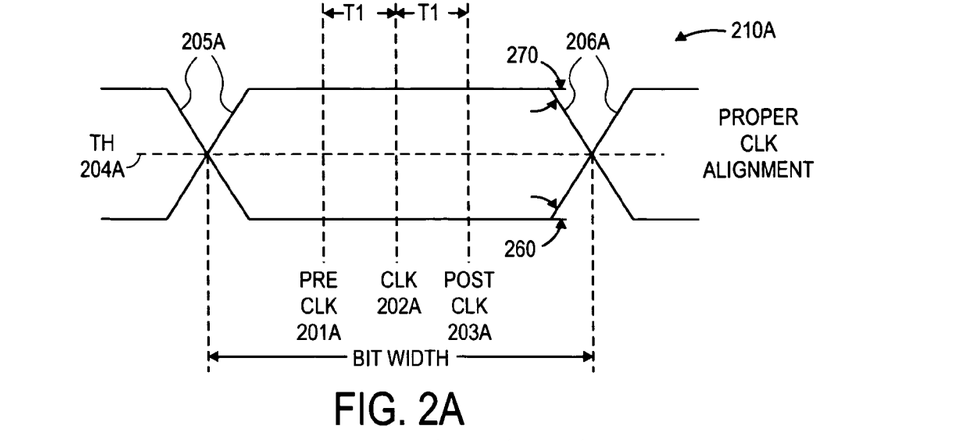
FIG. 2a shows proper clock alignment for sampling data.

Referring to FIG. 2a, the phase position 201a of a first clock (the "pre clock") precedes the phase position 202a of a second clock (the "clock") which precedes the phase position 203a of a third clock (the "post clock"). The phase position 202a of the clock corresponds to the phase location where data is actually sampled by a receiving device for the purpose of understanding the data it is receiving. As such, in order to eliminate skew, the phase position 202a of the clock is properly positioned when it is approximately midway between the edge transistions 205a, 206a of the received data waveform eye pattern 210a (which may be referred to simply as an eye pattern). As is known in the art, the eye pattern of a data stream can be observed by continuously displaying the data stream over a temporal width that spans slightly beyond a full bit width (so that the waveform shapes of logical 1s and logical 0s can be fully observed).

Data is also sampled at the phase positions 201a, 203a of the pre clock and post clock. However, data is sampled at these phase positions 201a, 203a for the purpose of "checking" the accuracy of the phase position 202a of the clock. For example, in FIG. 2a, the phase position 202a of the clock is properly located. As such, the phase position 201a of the pre clock is located within an open portion of the eye pattern 210a between the left edges 205a of the eye pattern 210a and the phase position 202a of the clock (as seen in FIG. 2a)).

Similarly, the phase position 203a of the post clock is also located within an open portion of the eye pattern 210a between the right edges 206a of the eye pattern 210a and the phase position 202a of the clock (as seen in FIG. 2a)). As the phase positions 201a, 202a, 203a of all three clocks are located within an open portion of the eye pattern 210a, the data samplings from all three clocks should be approximately the same (over time) when the phase position 202a of the clock is properly aligned (as seen in FIG. 2a). That is, the data samplings from all three clocks should be accurate because samples are being taken, in all three cases, within an open portion of the eye pattern 210a.

Figure 2B:
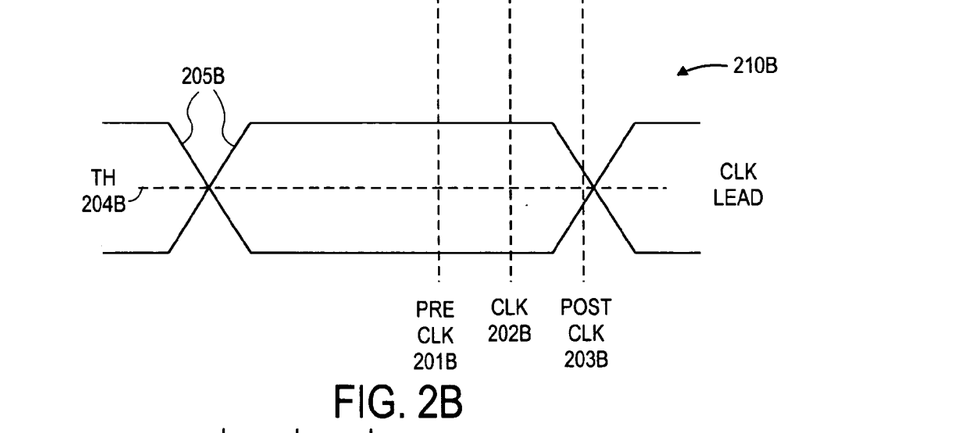

FIG. 2b demonstrates an instance (referred to as "clock leading") in which the phase position 202b of the clock is ahead of its proper location. If the phase positions 201b, 202b, 203b of the three clocks are designed to preserve their temporal distance T1 from one another (regardless of their temporal positioning with respect to the eye pattern 210a, 210b), a clock lead condition (as seen in FIG. 2b) will cause the phase position 203b of the post clock to be located at or near a closed portion of the eye pattern (e.g., within the right edges 206b of the eye pattern 210b).

Note that, in a clock lead condition, the phase positions 201b, 202b of the pre clock and clock remain in an open portion of the eye pattern 210b. As such, the data samplings from the pre clock and the clock will be approximately the same (over time). That is, because the data samplings from the pre clock and clock are made within an open portion of the eye pattern 210b, they should both be accurate.

However, the data samplings from the post clock, being made within a closed portion of the eye pattern 210b, will be inaccurate. As such, the data samplings from the post clock will be noticeably different (over time) than the data samplings from both the pre clock and clock. A clock lead condition, therefore, may be recognized if the data samplings from the post clock are different than the pre clock and clock where the data samplings from the pre clock and clock are approximately the same (over time).

Figure 2C:
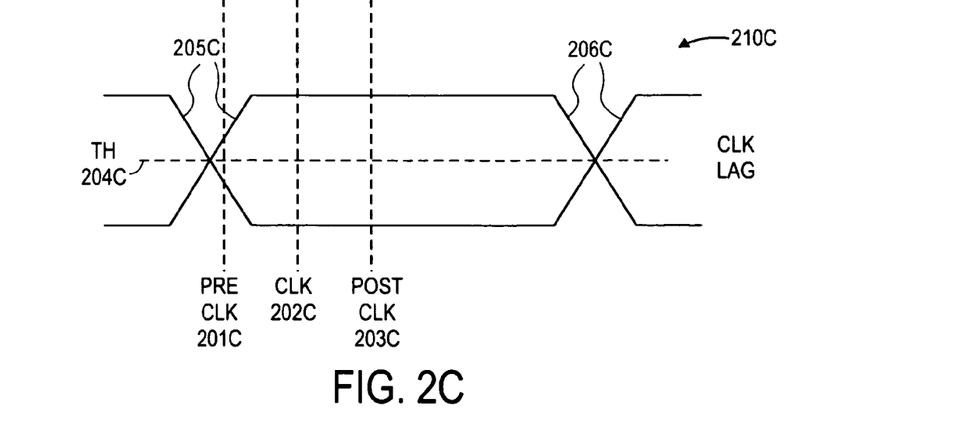

FIG. 2c demonstrates an instance (referred to as "clock lagging") in which the phase position 202c of the clock is behind of its proper location. Again, if the phase positions 201c, 202c, 203c of the three clocks are designed to preserve their temporal distance T1 from one another, a clock lag condition (as seen in FIG. 2c) will cause the phase position 201c of the pre clock to be located at or near a closed portion of the eye pattern (e.g., within the left edges 205c of the eye pattern 210c).

Note that, in a clock lag condition, the phase positions 202c, 203c of the clock and post clock remain in an open portion of the eye pattern 210c. As such, the data samplings from the clock and the post clock will be approximately the same (over time). That is, because the data samplings from the clock and post clock are made within an open portion of the eye pattern 210c, they should both be accurate.

However, the data samplings from the pre clock, being made within a closed portion of the eye pattern 210c, will be inaccurate. As such, the data samplings from the pre clock will be noticeably different than the data samplings from both the clock and the post clock. A clock lag condition, therefore, may be recognized if the data samplings from the pre clock are different than the clock and post clock where the data samplings from the clock and post clock are approximately the same (over time).

The recognition of clock lead or clock lag conditions, as described above, can be used to implement a stable feedback loop that continually drives the phase position 202a of the clock to be properly aligned. That is, once the phase position 202a of the clock is properly aligned, any subsequent "drifting" of the clock towards a lead or lag condition can be identified and used to drive the clock back to its proper position prior to any inaccurate data samplings from the clock.

Figure 3:
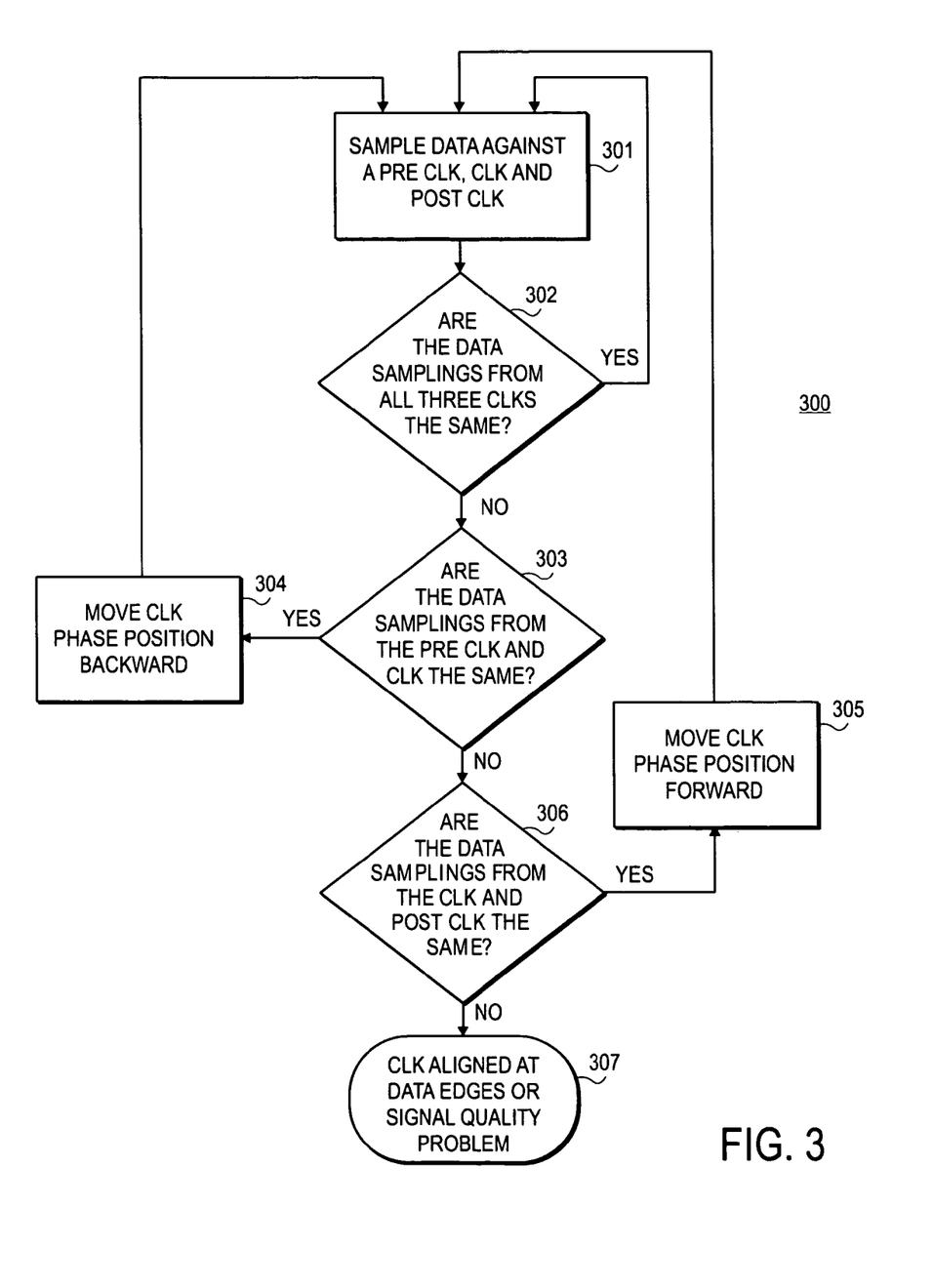
FIG. 3 shows a methodology for gaining proper clock alignment for sampling data.

FIG. 3 shows an exemplary methodology 300 of the operation of such a feedback loop. Data is sampled 301 from a pre clock, clock and post clock. If the data samplings from all three clocks is approximately the same (over time) 302, data continues to be sampled. However, a clock lag or clock lead condition may exist if the data samplings from all three clocks is not approximately the same (over time) 302.

Specifically, a clock lead condition exists if the data samplings from the pre clock and clock are approximately the same (over time) 303. In response, the phase position of the clock may be moved backward 304 (with respect to its current position within the eye pattern). Similarly, a clock lag condition exists if the data samplings from the clock and post clock are approximately the same (over time) 306. In response, the phase position of the clock may be moved forward 305 (with respect to its current position within the eye pattern).

If the data samplings from two clocks are not approximately the same (over time) 307 then the phase position of the clock is aligned with a closed portion of the eye pattern (e.g. at the left edges 205a or right edges 206a shown in FIG. 2a) or a signal quality problem exists. If the clock is aligned in a closed portion of the eye pattern, the phase position of the clock may be moved forward or backward to correct the alignment problem. In an embodiment, the phase position is automatically moved (forward or backward) approximately half a bit width so as to "jump start" the phase position of the clock at approximately the proper location). In an alternate embodiment, no such "jump start" is implemented and the phase position migrates to the proper position naturally.

Figure 4:
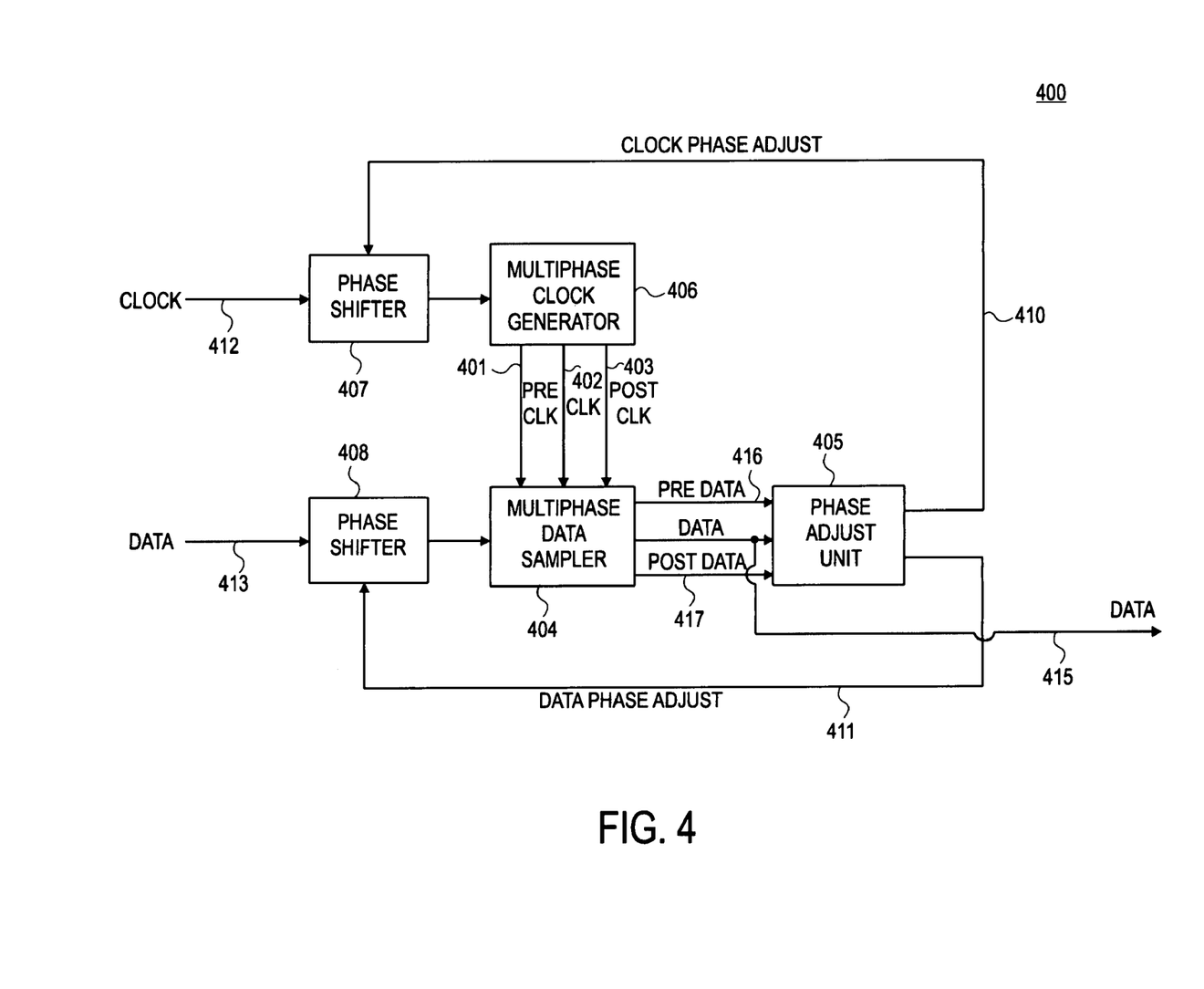
FIG. 4 shows an embodiment of a circuit that can perform the methodology outlined in FIG. 3.

FIG. 4 shows an embodiment of a circuit design 400 that can operate according to the methodology 300 described above with respect to FIG. 3. In the approach of FIG. 4, clock signal line 412 may be viewed as corresponding to clock signal line 112 of FIG. 1 and data signal line 413 may be viewed as corresponding to data signal line 113 of FIG. 1. As such, the circuitry 400 may be viewed as being within a receiving unit.

Data output 415 corresponds to the data being sent to the receiving unit (as determined by the circuitry 400 of FIG. 4). The circuitry 400 of FIG. 4, as described in more detail below, generates three clocks: 1) a pre clock which appears on pre clk signal line 401; 2) a clock which appears on clk signal line 402; and 3) a post clock which appears on post clk signal line 403. As such, the circuitry 400 of FIG. 4 is devoted to maintaining the phase positions of the signals on the pre clk, clk and post clk lines 401, 402, 403 to correspond to the properly aligned phase positions 201a, 202a, 203a originally shown back in FIG. 2a.

The multiphase clock generator 406 generates the trio of clocks from the clock signal received from the link on clock signal line 412. Note that the clock signal received on the clock signal line 412 may be phase shifted by the phase shifter 407 in accordance with the phase position adjustment strategy described in more detail below. The trio of clocks (pre clk, clk and post clk) are generated from the clock signal received on clock signal line 412 (as shifted by phase shifter 407 if any phase shift is appropriate) by the multiphase clock generator 406.

In an embodiment, the multiphase clock generator 406 applies three different, fixed phase delays to the clock signal provided by phase shifter 407. For example, the trio of clocks may be generated by: 1) directly passing the phase shifter 407 output clock without a phase delay upon pre clk signal line 401 to form the pre clk signal; 2) passing the phase shifter 407 output clock with a phase delay of T1 upon clk signal line 402 to form the clk signal; and 3) passing the phase shifter 407 output clock with a phase delay of 2T1 upon post clk signal line 403 to form the post clk signal. The T1 and 2T1 phase delays may be imposed in any of a variety of ways such as passing the clk signal through a gate or buffer having a propagation delay of T1 and passing the post clk signal through a pair of gates or buffers that each posses a propagation delay of 2T1.

The above design approach will provide the trio of clocks with a phase position difference of T1 with respect to one another as observed in FIG. 2a. Note that the amount of phase delay T1 may vary from embodiment to embodiment. That is, for example, the phase position spacing T1 may be tailored in light of the expected, worst case or "designed for" eye pattern signal quality. A poorer quality eye pattern corresponds to a smaller eye opening.

For example, referring briefly to FIG. 2a, the eye pattern 210a quality will degrade as the left and right signal transitions 205a, 206a move closer together while the bit width remains the same. For example, as the slope angles of the signal transistions decrease (noting that exemplary slope angles 260, 270 are shown for right signal transistions 206a of FIG. 2a), for a fixed bit width, the signal transistions 205a, 206a begin to move closer together which corresponds to the signal transistions consuming a greater portion of the eye pattern. This, in turn, corresponds to a reduced eye opening which may be viewed as a poorer quality eye pattern.

As such, if a poor quality eye pattern is expected or designed for (e.g., as a worst case condition or otherwise), the phase position spacing T1 of the trio of clocks may be reduced. That is, recall that: 1) the phase positions 201a, 202a, 203a of all three clocks should provide for accurate data recovery when the clk signal is properly aligned (as observed in FIG. 2a); and 2) a phase lag or lead position is identified when the phase position of one of the "outer" clocks (i.e., the pre clock or post clock) begins to result in different, inaccurate data recovery (as compared to the remaining clocks).

Thus, under poor quality eye pattern environments, the phase position spacing T1 may be designed to be small to ensure proper data recovery for all three clocks when the clk signal is properly aligned. Typically, poor quality eye patterns are associated with high speed data links because the speed of the data link begins to approach the maximum bandwidth offered by the signal lines. As such, as the speed of the data link increases, the phase positions of the three clocks may be designed closer together. Alternatively, the phase position of the clock may be allowed to "dither" back and forth within the open portion of the eye (which will still produce correctly interpreted data) in response to the pair of "outer" clocks being alternately positioned too close to the edges of the eye opening.

A multiphase data sampler 404 samples the data received on data signal line 413 (as phase shifted by phase shifter 408 if any such phase shift is appropriate as described in more detail below) at the phase position of each of the three clocks provided by the multiphase clock generator 406. As such, three streams of sampled data (pre data, data, and post data) are provided to a phase adjust unit 405.

The pre data stream, which is provided on signal line 416, corresponds to the data samplings performed with the pre clk signal provided on the pre clk signal line 401. The data stream, which is provided on signal line 415, corresponds to the data samplings performed with the clk signal provided on the clk signal line 402. The post data stream, which is provided on signal line 415, corresponds to the data samplings performed with the post clk signal provided on the post clk signal line 403.

As mentioned above, the phase position of the pre clk, clk and post clk corresponds to the temporal location where data is sampled. Data is typically sampled against a threshold such as threshold 204a of FIG. 2a. For example, referring to FIG. 2a, if data is sampled on a rising edge of a clock, the phase position of the clock's rising edge corresponds to the temporal location where an inquiry is made as to whether or not the data signal is above the threshold 204a or below the threshold 204a.

Typically, if the data signal is above the threshold 204a the data is interpreted as a "1"; or, if the data signal is below the threshold 204a the data is interpreted as a "0". Note that the data samplings from the data stream signal line 415 can be interpreted as the "main" or "primary" interpretation of the data being received. As such, as seen in FIG. 4, signal line 415 corresponds to the circuitry 400 output.

A phase adjust unit 405 determines whether a phase adjustment of the trio of clocks is appropriate. As described above, the data samplings from the three streams of data (pre data, data and post data) may be compared with one another. If they are the same, no phase adjustment needs to be made. If the pre data stream and data stream are the same but the post data stream is different, a clock lead condition exists and the phase position of the trio of clocks may be effectively adjusted "backward" with respect to their position with the eye pattern opening.

If the data stream and post data stream are the same but the pre data stream is different, a clock lag condition exists and the phase position of the trio of clocks may be effectively adjusted "forward" with respect to their position with the eye pattern opening. The phase position of the trio of clocks may be effectively adjusted "backward" with respect to their position within the eye pattern by either imposing more delay with the clock signal phase shifter 407 or by imposing less delay with the data signal phase shifter 408 (or a combination of both).

The phase position of the trio of clocks may be effectively adjusted "forward" with respect to their position within the eye pattern by either imposing less delay with the clock signal phase shifter 407 or by imposing more delay with the data signal phase shifter 408 (or a combination of both). The phase adjust unit 405 can make these phase adjustments by controlling the clock phase adjust 410 (to set the delay imposed by the clock signal phase shifter 407) and/or the data phase adjust 411 (to set the delay imposed by the data signal phase shifter 408). Note that both a clock signal phase shifter 407 and a data signal phase shifter 408 are not necessarily required. That is, appropriate phase adjustments may still be made even if only a clock signal phase shifter 407 is implemented or if only a data signal phase shifter 408 is implemented.

The phase shifters 407, 408 may be implemented in any of a number of ways. In many applications, the delay imposed by each a phase shifter 407, 408 is proportional to the voltage level on its corresponding adjust line 410, 411. For example if the voltage swing on an adjust line 410 is configured to be between V1 (at a minimum) and V2 (at a maximum), the clock signal phase shifter 407 may be designed to have a nominal delay of X (e.g., as measured in pico seconds) for an adjust line voltage of (V1+V2)/2.

If the adjust line 410 voltage drops below (V1+V2)/2, the corresponding delay imposed by the phase shifter 407 falls below X; and, correspondingly, if the adjust line 410 voltage rises above (V1+V2)/2, the corresponding delay imposed by the phase shifter 407 rises above X. In one embodiment, the phase clock signal shifter 407 (and/or data signal phase shifter 408) is implemented as series of buffers.

If the adjust line voltage 410 is (V1+V2)/2, the nominal delay is imposed by tapping the phase shifter 407 output from a central buffer. If the adjust line voltage 410 falls below (V1+V2)/2 the phase shifter 407 output is taken from a buffer that precedes the central buffer in the series; and, if the adjust line voltage 410 rises above (V1+V2)/2 the phase shifter 407 output is taken from a buffer that follows the central buffer in the series. In an alternative embodiment, the phase shifters 407, 408 increase or decrease a capacitance in order to implement the appropriate phase shift. In another alternative embodiment, the phase adjust unit 405 output adjust lines 410, 411 are digital words that the phase shifters 407, 408 respond to.

Figure 5:
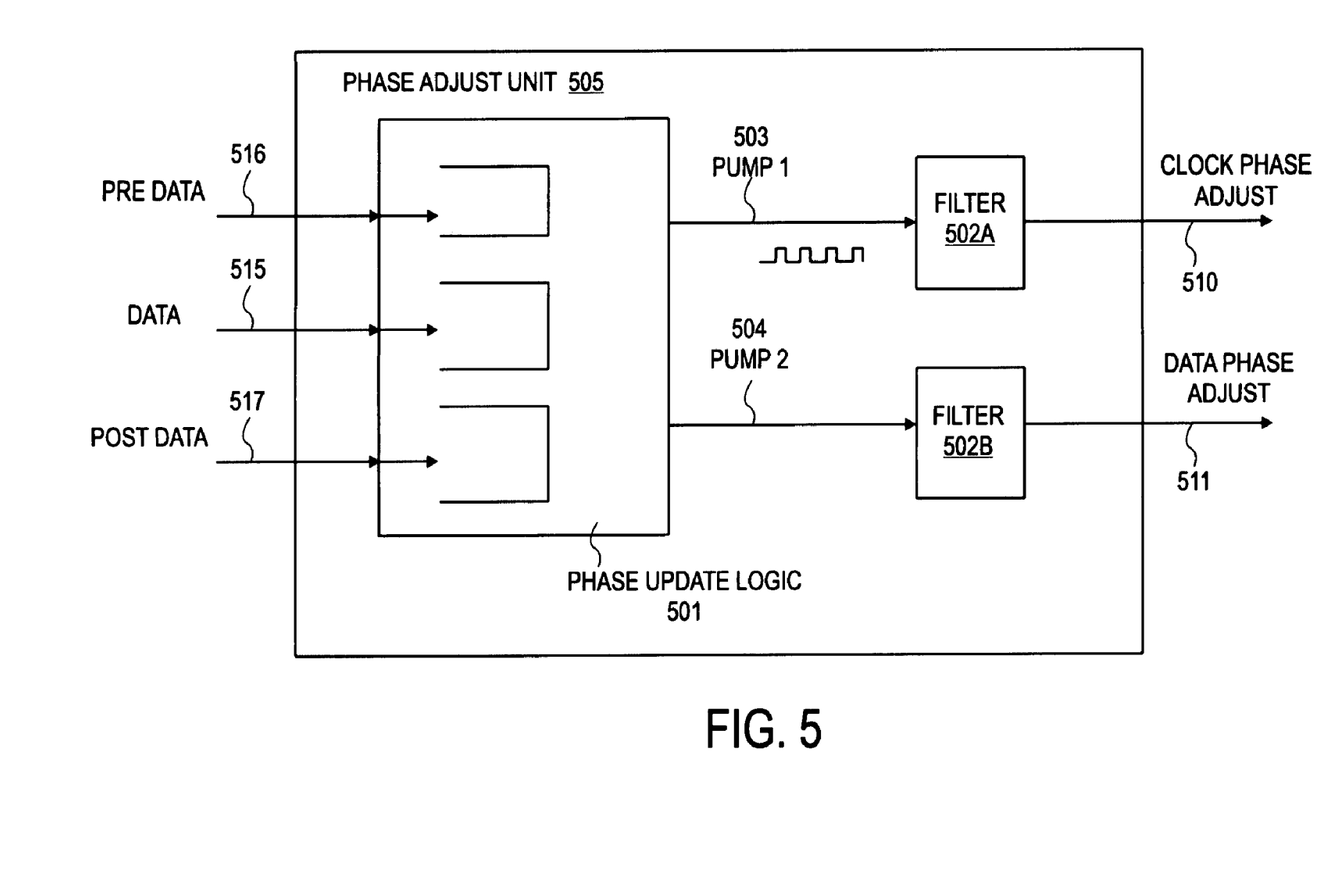
FIG. 5 shows an embodiment of a phase adjust unit that may be used for the phase adjust unit of FIG. 4.

FIG. 5 shows an embodiment of a phase adjust unit 505 that may be used for the phase adjust unit 405 of FIG. 4. The phase update logic 501 monitors the pre data, data and post data streams that are respectively provided on signal lines 516, 515, 517. Consistent with the methodology described above, the phase update logic 501 triggers an appropriate phase shift (or shifts) in the clock signal phase shifter 407 and/or the data signal phase shifter 408.

In the embodiment of FIG. 5, the appropriate voltage on the adjust lines 510, 511 may be developed by running a stream of current pulses (via pump 1 line 503 for clock adjust line 510 and pump 2 line 504 for data adjust line 511) into a corresponding filter 502a, 502b. For example, if it is appropriate to impose more delay through the clock phase shifter, the voltage on the clock phase adjust line 510 may be raised by running a stream of positive current pulses (via pump 1 line 503) through filter 502a.

Alternatively, if it is appropriate to impose less delay through the clock phase shifter, the voltage on the clock phase adjust line 510 may be lowered by running a stream of negative current pulses (via pump1 line 503) through filter 502a. The voltage on the data phase adjust line 511 may be similarly adjusted. The use of the filters 502a,b helps "smooth" the feedback response. That is, gradual adjustments are made to the phase position of the trio of clocks rather than chaotically "jumping" from phase position to position to phase position in response to disimilarities in the data. Note that a digital approach may be used instead of the analog approach as described just above. That is, a digital word may be presented at the output of the phase update logic unit 501 (and the output of filters 502a,b) such that filters 502a,b are implemented as digital filters rather than analog filters (e.g., as an accumulator circuit with feedback).

The phase update logic 501 may compare the pre data, data and post data streams in any of a number of different ways. For example, in one approach, a different first-in-first-out (FIFO) queue is used to individually receive each data stream (e.g., a pre data FIFO, a data FIFO and a post data FIFO). The data collected in each queue is compared against one another.

Based upon the similarity of the data patterns within the queues, the phase adjust unit 505 can determine whether or not a phase adjustment is appropriate (e.g., if a clock lead or a clock lag condition exists). In a further embodiment, comparisons of each queue with respect to another are made via correlation (which is a mathematical technique that measures the likeness of two data patterns). Is still other embodiments, comparisons may be made (with or without the use of queues) by comparing a running average of the data streams. A number of comparisons may be made before a decision is reached. As such, it is clearly deemed, over time, whether or not the data streams are approximately the same.

It is important to point out that an "identical" comparison of the data streams need not exist in order to determine that the phase position of the clk signal is properly aligned. That is, a designer may allow for modest differences between the various data streams before phase adjustments are deemed appropriate. As such, the present teachings apply to techniques where less than "identical" data comparisons are sufficient for considering the phase positions of the trio of clocks to be acceptable (e.g., "substantially the same"). The degree as to which dissimilarities are deemed allowable may be tailored according to designer preference.

It is also important to note that embodiments that employ other than a trio of clocks are possible as well. For example, as just one possible alternative approach, five clocks may be configured (e.g., a pre pre clk, a pre clk, a clk, post clk, and a post post clk) where each of the five clocks posses a phase position spacing of T1 from a neighboring clock. An even number of clocks is also possible. For example, out of four clocks, one of the "inner" clocks (i.e., the $2^{nd}$ or $3^{rd}$ clock) may be chosen for actual data sampling.

Note that the approach of FIG. 4 may be implemented in an "on the fly" fashion in which live data is actually transported over the link while, simultaneously, streams of data are being compared and adjustments to the clock phase positions are being made. In an alternate approach, a "setup" mode is implemented rather than an "on the fly" mode. That is, the proper phase position of the clocks is established by the circuitry 400 prior to the transportation of actual (e.g., "customer") data over the serial link. This approach may be viewed as a form of calibration (e.g., to eliminate skew problems implemented by the layout of signal traces between the transmitting and receiving devices of the link).

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:

sampling data at a plurality of different relative phase positions between a clock signal and a data signal, said sampling producing a data output signal, a pre data signal and a post data signal, said post data signal being produced with a leading clock phase position relative to a clock phase position used to generate said data output signal, said pre data signal being produced with a lagging clock phase position relative to said clock phase position used to generate said data output signal;

feeding said data output signal into a first first-in-first-out (FIFO) queue, feeding said pre data signal into a second FIFO queue and feeding said data output signal into a third FIFO queue; and, separately adjusting both said data signal's phase position and said clock signal's phase position to change said relative phase positions between said clock signal and said data signal at which data is sampled.

2. The method of claim 1 wherein said change results in a reduction in the lead of said leading clock phase position if said sampling created a post data signal different than said data output signal and said pre data signal.

3. The method of claim 1 wherein said change results in a reduction in the lag of said lagging clock phase position if said sampling created a pre data signal different than said data output signal and said post data signal.

4. The method of claim 1 further comprising generating, from said clock signal, a plurality of clocks with different phase positions with respect to each other prior to said sampling in order to create said different relative phase positions between said clock signal and said data signal.

5. The method of claim 1 wherein said separately adjusting comprises running a first signal through a first filter to produce an input signal for a first phase shift circuit that applies a phase shift to said clock signal, and, running a second signal through a second filter to produce an input signal for a second phase shift circuit that applies a phase shift to said data signal.

6. An apparatus, comprising:

a) a first phase shift circuit having an input to receive a clock signal, said first phase shift circuit to adjust said clock signal's phase position;

b) a second phase shift circuit having an input to receive a data signal, said second phase shift circuit to adjust said data signal's phase position;

c) a multiphase data sampler circuit downstream from both said first and second phase shift circuits, said multiphase data sampler circuit to sample data at a plurality of different relative clock and data phase positions, said multiphase data sampler having a pre data output, a data output and a post data output;

d) a first loop from said multiphase data sampler to said first phase shift circuit;

e) a second loop from said multiphase data sampler to said second phase shift circuit and, f) a first first-in-first-out (FIFO) queue coupled to said pre data output, a second FIFO queue coupled to said data output and a third FIFO queue coupled to said post data output.

7. The apparatus of claim 6 further comprising a first filter having an output coupled to a second input of said first phase shift circuit, and, a second filter having an output coupled to a second input of said second phase shift circuit.

8. The apparatus of claim 6 further comprising a multiphase clock generator circuit coupled between an output of said first phase circuit and an input of said multiphase data sampler.

9. An apparatus, comprising:

a) a first feedback path;

b) a second feedback path;

c) a first phase shift circuit having an input to receive a clock signal, said first phase shift circuit downstream from said first feedback path;

d) a second phase shift circuit having an input to receive a data signal, said first phase shift circuit downstream from said first feedback path;

e) a multiphase data sampler circuit downstream from both said first and second phase shift circuits, said multiphase data sampler circuit to sample data at a plurality of different relative clock and data phase positions, said multiphase data sampler having a pre data output, a data output and a post data output; and, f) phase adjust circuitry to determine a first phase shift applied by said first phase shift circuit and to determine a second phase shift applied by said second phase shift circuit, said phase adjust circuitry having inputs coupled to outputs of said multiphase data sampler, said phase adjust circuitry having a first output coupled to a second input of said first phase shift circuit, said phase adjust circuitry having a second output coupled to a second input of said second phase shift circuit said phase adjust circuitry further comprising a first first-in-first-out (FIFO) queue coupled to said pre data output, a second FIFO queue coupled to said data output and a third FIFO queue coupled to said Post data output.

10. The apparatus of claim 9 wherein said phase adjust circuitry further comprises a first filter having an output coupled to a second input of said first phase shift circuit, and, a second filter having an output coupled to a second input of said second phase shift circuit.

11. The apparatus of claim 9 further comprising a multiphase clock generator circuit coupled between an output of said first phase circuit and an input of said multiphase data sampler.

* * * * *

UNITED STATES PATENT AND TRADEMARK OFFICE
CERTIFICATE OF CORRECTION

PATENT NO. : 7,167,533 B2
APPLICATION NO. : 09/895481
DATED : January 23, 2007
INVENTOR(S) : Glenn et al.

It is certified that error appears in the above-identified patent and that said Letters Patent is hereby corrected as shown below:

In column 10, at line 42, delete "Post" and insert --post--.

In column 10, at line 46, delete "a" and insert --the--.

In column 10, at line 47, delete the second occurrence of "a" and insert --the--.

Signed and Sealed this

Eighth Day of April, 2008

JON W. DUDAS
*Director of the United States Patent and Trademark Office*